(No Model.)  
2 Sheets—Sheet 1.

C. L. McKESSON.
CLOTH MEASURING MACHINE.

No. 368,410. Patented Aug. 16, 1887.

Witnesses:

Inventor:
Chas. L. McKesson,
by R. G. Dyrenforth
his Attorney (No Model.) 2 Sheets—Sheet 2.
C. L. McKESSON.
CLOTH MEASURING MACHINE.
No. 368,410. Patented Aug. 16, 1887.
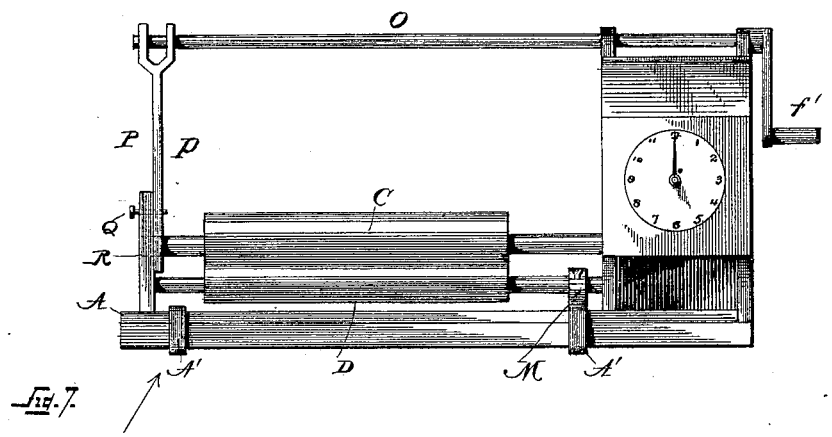
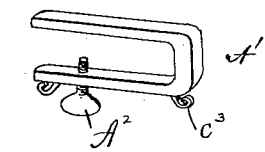
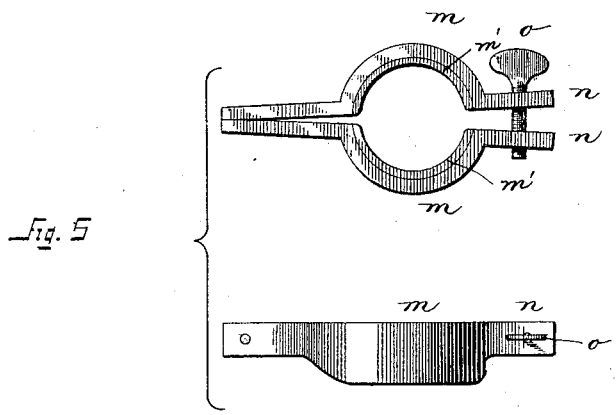
Witnesses.
Inventor:
Chas. L. McKesson,
by R. G. Dyrenforth,
his Attorney

UNITED STATES PATENT OFFICE.

CHARLES L. McKESSON, OF LONGTON, KANSAS.

CLOTH-MEASURING MACHINE.

SPECIFICATION forming part of Letters Patent No. 368,410, dated August 16, 1887.

Application filed July 21, 1886. Serial No. 208,594. (No model.)

*To all whom it may concern:*

Be it known that I, CHARLES L. MCKESSON, a citizen of the United States, residing at Longton, in the county of Elk and State of Kansas, have invented a certain new and useful Improvement in Cloth-Measuring Machines, constituting a merchant's assistant; and I do hereby declare the following to be a full, clear, and exact description of the invention, such as will enable others skilled in the art to which it appertains to make and use the same.

My invention relates to cloth-measuring apparatus.

The object is to provide an apparatus of cheap and simple construction by which fabrics may be easily and rapidly measured, and which may be readily attached to and detached from a counter or table in the store of a dry-goods or other merchant dealing in fabrics that have to be measured, thus constituting a merchant's assistant.

The invention consists in the combination, with a base or frame provided with means for measuring and winding the goods, of an easily-detachable receptacle, in which the material to be measured is placed.

The invention further consists in the peculiar construction of certain parts employed in the apparatus, as will be hereinafter more particularly described and claimed.

Figure 1:
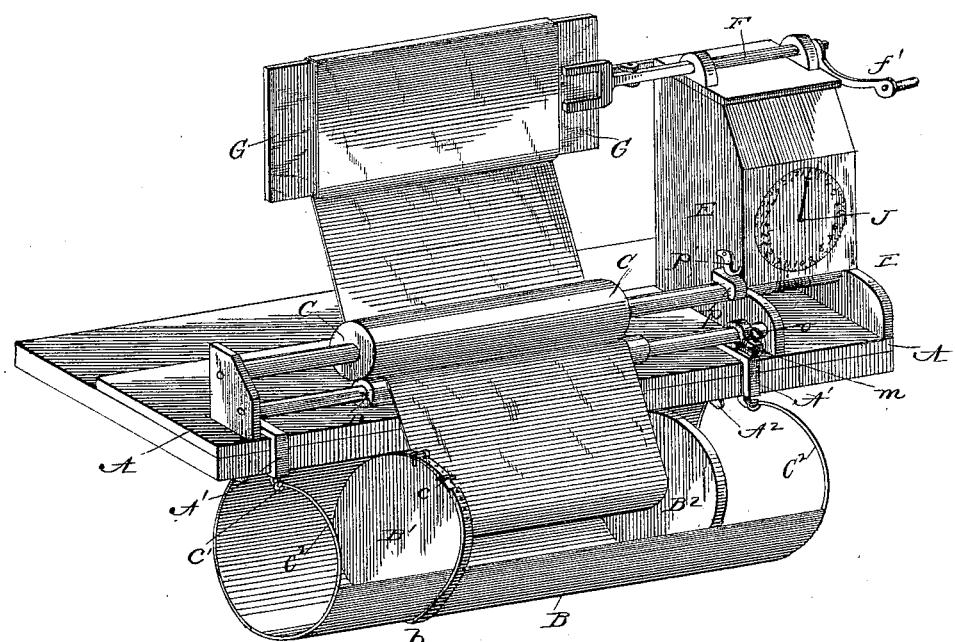
Figures 2, 6:
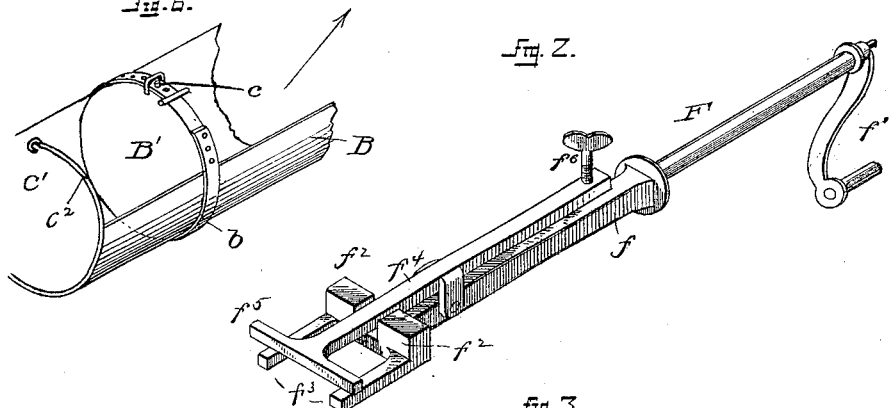
Figure 3:
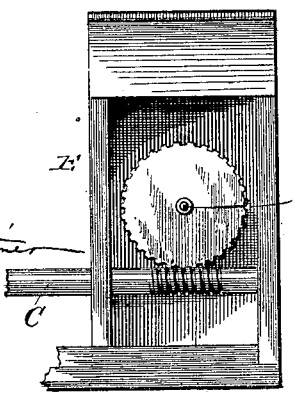

In the accompanying drawings, illustrating a machine constructed in accordance with my invention, Figure 1 is an isometric view showing the apparatus attached to a counter and ready for operation. Fig. 2 is an isometric view of an improved device for holding and revolving the board upon which the cloth is to be wound. Fig. 3 is a detail view showing the means for operating the registering device. Fig. 4 illustrates an apparatus provided with an additional standard for supporting the shaft of the board-holder when extraordinarily heavy material—carpet, for example—is to be measured and wound. Fig. 5 illustrates detail views of the tension device. Fig. 6 is an enlarged view, in isometric perspective, of the movable end piece in the receptacle for the cloth which is to be measured and wound, and Fig. 7 an isometric view of the clamp or bracket for securing the base containing the measuring and winding apparatus in place.

Where like symbols of reference occur in different figures of the drawings they indicate corresponding parts.

The letter A designates a base having suitable standards, in which rollers C and D are journaled. The roller C is provided with a worm engaging a toothed gear, I, mounted on a shaft, J, provided at its end with a hand or pointer, which, in connection with a dial, will indicate the units measured. The mechanism for registering may of course be varied or changed to suit circumstances. It is preferably inclosed within a box or case, E.

On the top of the case E is secured, in suitable bearings, the shaft of the board-holding device F, which consists of a rod, $f$, made cylindrical on one end, where it is supported in bearings, and bifurcated or broadened, as at $f^3$, at the other end. It is further provided with a shoulder or stop, $f^2$, rising in a plane at right angles to the plane of the bifurcated portion. An arm, $f^4$, having a cross-piece, $f^5$, at one end and a screw, $f^6$, in the other, is pivoted to the rod $f$, so that the board G may be placed between the cross-piece $f^5$ and the bifurcated end $f^3$ and clamped in place by simply turning the screw $f^6$ in the proper direction. A crank, $f'$, on one end is used for revolving the board-holder. The base A is clamped to the counter or table by means of clamps or brackets A'. (See Fig. 7.)

The clamps or brackets are made of metal in the form of a rectangular frame, with one end omitted, as illustrated in Fig. 7. These clamps embrace the edges of the counter or table and the base A, which latter is held firmly in place by turning up the set-screw $A^2$ in the lower arm of the clamp against the under side of the table. This arm of the clamp is also provided with suitable hooks, for a purpose hereinafter stated.

The letter B designates the box or receptacle into which the roll of goods to be measured and wound is first placed. This receptacle is preferably made of sheet metal, and is a little greater than a half-cylinder. It is provided with two heads or end pieces, B' and B², one of which, B', is movable, and the other, B², fixed. The inner faces of these heads act as guides for the edges of the fabric to be measured as it is being drawn between the rollers.

One of the heads is made movable, in order that fabrics of different width may be placed therein. It is essential, however, that means for fixing the head in the desired position should be provided, and in the present instance the said means consists of a band, $b$, having one end secured to the head, the other passed around the box B and again (but removably) secured to the head by means of a pin or equivalent device, as clearly illustrated in Fig. 6.

The receptacle B is removably attached or suspended to the edge of the counter or table below the roller, and for this purpose it is provided with eyes or hoops, two of which (not shown) are formed upon the rear edge of the receptacle, and the other two, $c'$ $c'$, upon the ends of arms or rods $c^2$ $c^2$ on the front edge, which engage the hooks $c^3$ upon the under side of the clamp A', hereinafter referred to.

In order to regulate the freedom with which the rollers are to turn, I provide a tension device constructed substantially as shown in Fig. 5. This device is composed of two parts, $m$ $m$, hinged or secured together in any suitable way at one end, and having curved faces $m'$, lined with leather or similar material, to fit upon the opposite sides of the shaft of one of the rollers. The free ends $n$ $n$ of these parts are provided with a thumb-screw, $o$, by means of which the parts are brought together and thus made to bear upon the shaft with the force necessary to produce the desired friction to retard its revolution.

The tension or friction device is constructed so that when it is placed on the shaft that portion which is between the shaft and the base or the clamp A' will, by its contact with said base or clamp, be prevented from turning when the shaft is turned.

It is obvious that the lower member $m$ could be secured on the base or on the upper arm of the clamp, or that the said lower member $m$ could be made in the form of a block having the curved socket at its upper side to fit upon the shaft and its lower side plane to fit against the base. As illustrated, it is employed upon the shaft of the roller D; but it would require no great skill to adapt it for use on the shaft of the roller C.

Another form of tension device is illustrated in Fig. 1, and this consists of a block, $p$, having its under side curved, pivoted in the side of the case E, and a cam-piece, $p'$, also pivoted in the side of the case E, adapted to be turned down against the block $p$ to cause it to bear with the desired force upon the shaft of the roller C.

For measuring and winding very heavy fabric the board-holding device F is removed from the machine and in its place a rod, O, substituted, and in order that it may be firmly supported I provide a standard, P. This standard is detachably secured to the projection R on the base A by means of a screw, Q, or other fastening device.

My machine is attached to a counter in the following manner: The base A, containing the measuring and winding apparatus, is placed on the top thereof so that its front edge is in alignment with the edge of the counter. The clamps A' are next slipped over both edges and the set-screws A² turned up until the base is firmly secured to the counter. The receptacle B is then attached to the hook by means of the hooks or eyes upon its rear edge and those designated $c'$ $c'$ upon its front edge, when the whole is ready for use.

In operation a roll of fabric is placed in the receptacle B, the movable head B' being adjusted with respect to the fixed head in such manner that the roll may just fit therebetween. The end of the material is then passed between the rollers, after which it may be wound upon the board G in an obvious manner, the register in the meanwhile indicating the units of measure passed between the rollers.

It is, of course, plain that the material may thus be measured and wound either for putting the same in stock or for retail sale, in which latter case it is slipped from the board and folded in a neat compact bundle.

Having thus described my invention, what I claim as new, and desire to secure by Letters Patent, is—

1. The combination, with a base or frame provided with means for measuring and winding fabrics, and with means for detachably securing it to a counter, of a trough or receptacle to contain the material to be measured and wound, provided with means for detachably securing it in position, as set forth.

2. In a cloth-measuring apparatus, the receptacle B, provided with a movable head, B', and a fixed head, B², means for securing the movable head in place, consisting of a strap, $b$, secured to said head at one end and encircling the trough or receptacle, and means for detachably securing the other end to the head after it has been drawn tightly about the receptacle, as set forth.

3. In a cloth-measuring apparatus, the herein-described board-holding device, comprising a rod made cylindrical at one end and having its other end bifurcated or broadened, and provided with a shoulder or stop, $f^2$, rising in a plane at right angles to the plane of the bifurcated portion, and lever $f^4$, swinging on a fixed pivot in the rod, and provided with the broadened end $f^5$ and a set-screw, $f^6$, operating substantially as described and shown.

4. In cloth-measuring apparatus, the combination, with the shaft of a revolving measuring-roll, of a friction or tension device consisting of the parts $m$ $m$, having their inner faces curved, and means, substantially as described, for compressing and separating said parts, the device being secured to the machine by clamping to the shaft to be held against turning to act as a brake, substantially as described.

5. In a cloth-measuring apparatus, the brackets or clamps A', provided with a set-screw, A², and hooks C³, substantially as described.

In testimony whereof I affix my signature in presence of two witnesses.

CHARLES L. McKESSON.

Witnesses:
JONATHAN FRAZIER,
J. J. HUMBY.